(12) United States Patent
Classen

(10) Patent No.: US 9,279,822 B2
(45) Date of Patent: Mar. 8, 2016

(54) MICROMECHANICAL STRUCTURE AND METHOD FOR MANUFACTURING A MICROMECHANICAL STRUCTURE

(71) Applicant: Johannes Classen, Reutlingen (DE)

(72) Inventor: Johannes Classen, Reutlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 419 days.

(21) Appl. No.: 13/742,560

(22) Filed: Jan. 16, 2013

(65) Prior Publication Data

US 2013/0186200 A1 Jul. 25, 2013

(30) Foreign Application Priority Data

Jan. 23, 2012 (DE) .......... 10 2012 200 929

(51) Int. Cl.
| | |
|---|---|
| *G01P 15/02* | (2013.01) |
| *G01C 19/5747* | (2012.01) |
| *G01P 15/08* | (2006.01) |
| *G01P 15/125* | (2006.01) |
| *G01C 19/5769* | (2012.01) |

(52) U.S. Cl.
CPC .......... *G01P 15/02* (2013.01); *G01C 19/5747* (2013.01); *G01C 19/5769* (2013.01); *G01P 15/0802* (2013.01); *G01P 15/125* (2013.01); *G01P 2015/0814* (2013.01); *G01P 2015/0871* (2013.01); *Y10T 29/49826* (2015.01)

(58) Field of Classification Search
CPC .......... G01P 15/02; B81B 2201/0242
USPC .......... 73/504.12, 514.38
See application file for complete search history.

(56) References Cited

U.S. PATENT DOCUMENTS

| | | | |
|---|---|---|---|
| 6,915,693 B2* | 7/2005 | Kim et al. .......... | 73/504.12 |
| 7,878,061 B2* | 2/2011 | Classen et al. .......... | 73/514.38 |
| 2010/0212528 A1* | 8/2010 | Greywall .......... | 102/247 |
| 2011/0030472 A1* | 2/2011 | Aziz et al. .......... | 73/504.12 |
| 2011/0140692 A1* | 6/2011 | Classen et al. .......... | 324/244 |
| 2012/0006115 A1* | 1/2012 | Classen .......... | 73/504.13 |

FOREIGN PATENT DOCUMENTS

| | | |
|---|---|---|
| DE | 197 19 779 | 11/1998 |
| DE | 10 2007 060 878 | 6/2009 |
| DE | 10 2009 000 167 | 7/2010 |
| DE | 10 2009 000 345 | 7/2010 |

* cited by examiner

*Primary Examiner* — Eric S McCall
*Assistant Examiner* — Anthony W Megna Fuentes
(74) *Attorney, Agent, or Firm* — Kenyon & Kenyon LLP

(57) ABSTRACT

A micromechanical structure includes: a substrate which has a main plane of extension; and a mass which is movable relative to the substrate, the movable mass being elastically suspended via at least one coupling spring. A first subregion of the movable mass is situated, at least partially, between the substrate and the coupling spring along a vertical direction which is essentially perpendicular to the main plane of extension.

13 Claims, 4 Drawing Sheets

MICROMECHANICAL STRUCTURE AND METHOD FOR MANUFACTURING A MICROMECHANICAL STRUCTURE

BACKGROUND OF THE INVENTION

1. Field of the Invention

The present invention relates to a micromechanical structure, e.g., an acceleration sensor having a seismic mass.

2. Description of the Related Art

Such structures are generally known. For example, an acceleration sensor is known from published German patent application document DE 197 19 779 A1, having a seismic mass which is movably suspended on a substrate via suspension springs. When the acceleration sensor accelerates, inertial forces act on the seismic mass which deflect the seismic mass relative to the substrate. The extent of this deflection is measured with the aid of detection means. The detection means include a comb electrode structure composed of fixed electrodes attached to the substrate and counter electrodes attached to the seismic mass. The deflection is measured by evaluating the change in electrical capacitance between the fixed electrodes and the counter electrodes. In these types of structures, the seismic mass, the suspension springs, and the counter electrodes are provided in a single functional layer made of polycrystalline silicon (referred to below as "first functional layer"), so that these structures are always situated next to one another. A printed conductor plane made of a thin polycrystalline layer, provided between the substrate and the seismic mass and separated from the substrate wafer by an insulating oxide, is used for the electrical contacting.

For producing micromechanical structures, it has also been proposed in published German patent application document DE 10 2007 060 878 A1 to use an additional functional layer made of polycrystalline silicon (referred to below as "second functional layer"). Published German patent application document DE 10 2009 000 167 A1 discloses, for example, an acceleration sensor which is constructed using two separate functional layers, while a yaw rate sensor is known from published German patent application document DE 10 2009 000 345 A1 which has Coriolis elements for measuring a rotational speed, and which is constructed using two separate functional layers. The yaw rate sensor has a first and a second Coriolis element which are connected to one another via a coupling spring, and which with the aid of drive means are excited to vibrate in phase opposition parallel to a first axis, a first and a second detection means detecting a deflection of the first and second Coriolis elements based on a Coriolis force which acts on the Coriolis elements when a yaw rate is present, so that the difference in a first detection signal of the first detection means and a second detection signal of the second detection means is a function of the Coriolis force, and thus, also a function of the rotational speed of the yaw rate sensor.

BRIEF SUMMARY OF THE INVENTION

The micromechanical structure according to the present invention and the method according to the present invention for manufacturing a micromechanical structure have the advantage over the related art that a more compact and rigid design is achieved. The arrangement of the first subregion of the movable mass between the substrate and the coupling springs provided for the suspension has the advantage that the surface area requirements for the micromechanical structure are reduced, and therefore the manufacturing costs are lowered. In addition, due to the first subregion a coupling of second subregions of the movable mass, which are situated at the level of the coupling springs and which therefore must be separated from one another in the area of the coupling springs, is preferably achieved. As a result, rigidity of the movable mass is achieved, so that undesirable spurious modes are shifted to higher frequencies, and the vibration resistance of the micromechanical structure is thus increased compared to the related art. The movable mass is preferably a seismic mass, a Coriolis element, or a drive element for a Coriolis element. The micromechanical structure according to the present invention in particular includes a microelectromechanical system (MEMS) component, which is produced in a semiconductor manufacturing process.

The substrate preferably includes a semiconductor material, in particular silicon, which is appropriately structured for forming the movable mass and the coupling springs. The structuring is preferably carried out within the scope of a lithographic, etching, deposition, and/or bonding process. The micromechanical structure preferably has a printed conductor plane, made of a thin polycrystalline layer, which is used for the electrical contacting and is provided between the substrate and the movable mass and separated from the substrate wafer by an insulating oxide.

According to one preferred specific embodiment, it is provided that the micromechanical structure has a first functional layer and a second functional layer, the first and the second functional layers being offset relative to one another along the vertical direction in such a way that along the vertical direction the first functional layer is partially situated between the substrate and the second functional layer, the first subregion being provided in the first functional layer, and the coupling spring being provided in the second functional layer. The micromechanical structure is advantageously constructed from two functional layers, in particular the movable mass being composed of elements (first subregion) of the first layer and of elements (second subregion) of the second layer. It is thus possible to design a comparatively rigid movable mass which at the same time is suspended using so-called internal coupling springs. In other words, the coupling springs are not attached along the main plane of extension at the outermost edge area of the movable mass, but, rather, are situated inside the outermost edge area of the movable mass, so that a particularly space-saving micromechanical structure is achieved. The first and/or second functional layer preferably has/have a thickness between 1 and 50 microns.

According to one preferred specific embodiment, it is provided that a second subregion of the movable mass is provided in the second layer, and the coupling spring engages directly at the second subregion. It is thus advantageously possible to achieve a desired mass on a comparatively small wafer surface area. The first subregion is in particular indirectly connected to the coupling springs via the second subregion.

According to one preferred specific embodiment, it is provided that the first subregion and the second subregion mutually overlap in an overlap area along the vertical direction, and the first and the second functional layers in the overlap area are directly fixedly connected to one another, or indirectly fixedly connected to one another via an intermediate layer, resulting in a comparatively rigid and robust design of the movable mass. The vibration resistance of the micromechanical structure is thus advantageously further increased, since due to the greater rigidity the frequency spectrum of the undesirable spurious modes is shifted to higher frequencies. In particular, the distance from the desired useful modes is increased.

According to one preferred specific embodiment, it is provided that the micromechanical structure has at least one fixed electrode which extends parallel to the main plane of extension and is situated between the first subregion and the substrate, along the vertical direction, the fixed electrode and the first subregion forming a plate capacitor structure. The first subregion provided in the first functional layer is advantageously used not only for connecting and reinforcing the second subregion of the movable mass provided in the second functional layer in the region of the coupling springs, but also as a counter electrode for the fixed electrodes attached to the substrate. The micromechanical structure may thus be implemented with a particularly compact installation space, since a connecting area in which the movable mass is suspended via the coupling springs, and a detection area in which a movement of the movable mass relative to the substrate is to be capacitively detected, may mutually overlap along the vertical direction. The fixed electrode in the printed conductor plane is advantageously formed from the thin polycrystalline layer, which is separated from the substrate by an insulating oxide. The printed conductor plane preferably has a thickness between 0.2 and 1.0 microns, particularly preferably essentially 0.5 microns. In particular, the micromechanical structure has at least two mutually adjacent fixed electrodes which are electrically insulated from one another in order to detect a deflection of the movable mass parallel to the main plane of extension via a change in the overlap areas along the vertical direction.

According to one preferred specific embodiment, it is provided that the micromechanical structure has at least one stop spring which is connected to the substrate and provided in the second functional layer, a stop region of the first subregion of the movable mass provided in the first functional layer being situated between the stop spring and the substrate, along the vertical direction, and the stop spring being situated at a distance from the movable mass. A free-standing end of the stop spring oriented toward the movable mass is advantageously situated at a slight distance from the movable mass, both perpendicular and parallel to the main plane of extension, and is not connected to the movable mass. The stop springs designed as stop elements have the advantage that the maximum possible deflection of the movable mass relative to the substrate is limited in order to prevent damage of the micromechanical structure during excessively large deflections. The design of the stop elements as elastic spring elements has the advantage that the movable mass is not abruptly decelerated when it strikes against the stop elements; instead, the kinetic energy of the movable mass is at least partially absorbed by bending of the stop springs, and the movable mass is thus decelerated more slowly.

According to one preferred specific embodiment, it is provided that the micromechanical structure is part of an acceleration sensor, and the movable mass includes a seismic mass which is deflectable with respect to the substrate due to external acceleration forces. The acceleration sensor is advantageously designed in such a way that accelerations parallel to the main plane of extension are detectable, since in this case the movable mass is deflected relative to the substrate parallel to the main plane of extension due to inertial forces, and the overlap area between the fixed electrodes and the first subregions in the first functional layer which function as a counter electrode changes. The change in the overlap area then results in an electrically evaluatable change in capacitance.

Alternatively, it would be conceivable to detect a deflection of the seismic mass perpendicular to the main plane of extension in order to detect accelerations perpendicular to the main plane of extension. A change in capacitance is then detected based on a change in distance between the fixed electrodes and the first subregions in the first functional layer which function as a counter electrode, and is evaluated.

According to one preferred specific embodiment, it is provided that the micromechanical structure is part of a yaw rate sensor, the movable mass including a Coriolis element which is deflectable relative to the substrate by Coriolis forces when a yaw rate is present, and/or the movable mass including a drive element which may be induced to vibrate by a drive means and which is coupled via drive springs to a Coriolis element which is deflectable relative to the substrate by Coriolis forces when a yaw rate is present. The micromechanical structure thus in particular forms a part of such a yaw rate sensor, which is designed to detect yaw rates parallel to the main plane of extension. The movable mass is the Coriolis element and/or the drive element for the Coriolis element. In both cases it is advantageous for the first subregion to be situated between the coupling springs and the substrate, since a design of the Coriolis element and/or of the drive frame having a particularly compact installation space and a rigid construction may thus be achieved, so that cost-effective manufacture and high resistance to vibration may be implemented. It is also advantageous if the detection electrodes for detecting the deflection of the Coriolis element or for monitoring the drive vibration of the drive element are provided in the particular first subregion in order to reduce additional surface area requirements. The drive element preferably includes a drive frame which at least partially frames the Coriolis element.

According to one preferred specific embodiment, it is provided that the micromechanical structure is part of an actuator, and the movable mass includes an actuator means which is drivable by a drive means. An actuator which is particularly robust and has a compact installation space is thus advantageously implemented.

A further object of the present invention is a method for manufacturing a micromechanical structure, the substrate being provided in a first manufacturing step, the first functional layer being arranged and the first subregion of the movable mass being provided in the first functional layer in a second manufacturing step, and the second functional layer being arranged and the coupling spring being provided in the second functional layer in a third manufacturing step in such a way that the first subregion is situated between the substrate and the spring element along the vertical direction. The manufacture of a micromechanical structure which is more robust and compact compared to the related art is thus advantageously made possible using standard semiconductor manufacturing processes, so that particularly cost-effective manufacture is achieved.

According to one preferred specific embodiment, it is provided that a second subregion of the movable mass is provided in the second functional layer in the third manufacturing step, and/or in an intermediate step carried out between the second and the third method step an intermediate layer is provided on the first functional layer, and the intermediate layer is structured in such a way that the first subregion and the second subregion are fixedly connected to one another in an overlap area via the intermediate layer. The movable mass is advantageously formed from the first functional layer as well as from the second functional layer, thus allowing rigid bridging of areas in which the coupling springs are situated.

Exemplary embodiments of the present invention are illustrated in the drawings and explained in greater detail in the following description.

DETAILED DESCRIPTION OF THE INVENTION

Figure 1A:
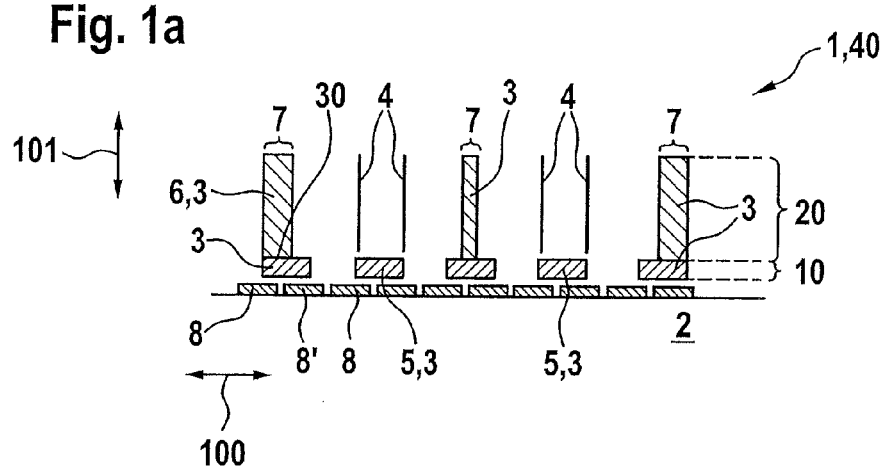
FIGS. 1a and 1b show schematic views of a micromechanical structure designed as an acceleration sensor according to a first specific embodiment of the present invention.

Identical parts are always provided with the same reference numerals in the various figures, and therefore are generally designated or mentioned only once.

Figure 1B:
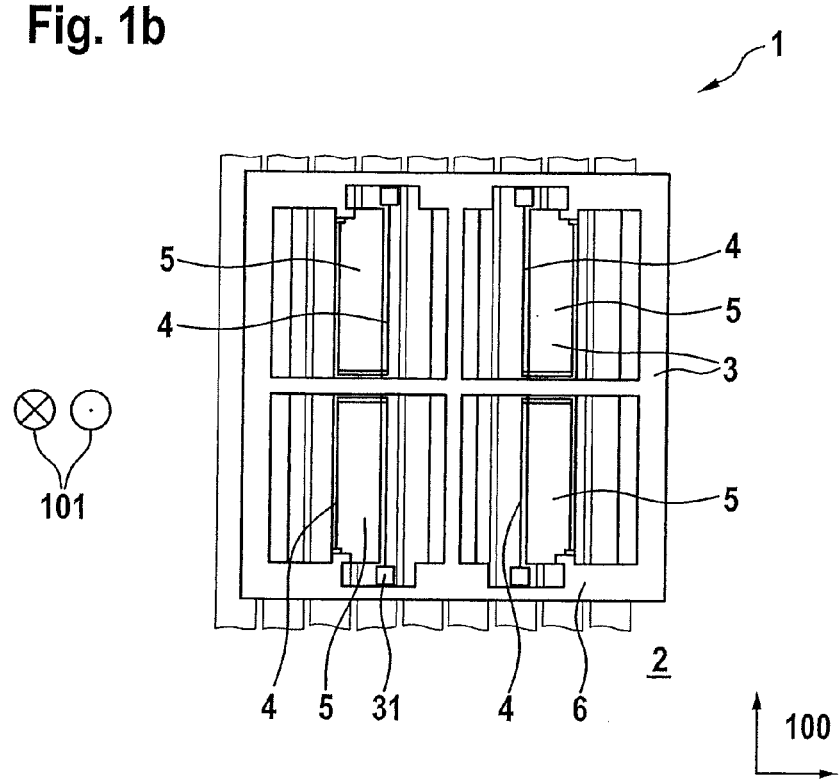

FIG. 1a illustrates a schematic sectional view, and FIG. 1b illustrates a schematic top view illustration, of a micromechanical structure 1 designed as an acceleration sensor 40 according to a first specific embodiment of the present invention. Micromechanical structure 1 includes a substrate 2 and a movable mass 3 which is movably suspended relative to substrate 2. With the aid of coupling springs 4, movable mass 3 is elastically attached to substrate anchors 31 fixed to the substrate. Movable mass 3 includes a first subregion 5 which is provided in a first functional layer 10 of micromechanical structure 1, and a second subregion 6 which is provided in a second functional layer 20 of micromechanical structure 1. Second subregion 6 functions as a frame element on which coupling springs 4 directly engage. Coupling springs 4 are preferably designed as U springs which allow movement of movable mass 3 parallel to a main plane of extension 100 of substrate 2. Coupling springs 4 are also designed as interior spring structures. In other words, along main plane of extension 100, coupling springs 4 are essentially framed or enclosed by second subregion 6, which is designed as a frame, so that a configuration having the most compact installation space possible is achieved. First and second subregions 5, 6, respectively, are rigidly connected to one another at their overlap areas 7 along a vertical direction 101 perpendicular to main plane of extension 100, for example via an intermediate layer 30, designed as an oxide layer, between first and second functional layers 10, 20, respectively.

Micromechanical structure 1 also has fixed electrodes 8, 8' which are provided in a printed conductor plane situated between first functional layer 10 and substrate 2. Two adjacent fixed electrodes 8, 8' along vertical direction 101 preferably overlap, at least partially, with first subregion 5, so that portions of first subregion 5 function as a counter electrode for fixed electrodes 8, 8', and a plate capacitor structure composed of fixed electrodes and counter electrodes is implemented. Movable mass 3 preferably has a first subregion 5 which functions as a counter electrode, and which is situated along vertical direction 101 between a coupling spring 4 and two adjacent fixed electrodes 8, 8' which are electrically insulated from one another.

If an acceleration now acts on micromechanical structure 1 along main plane of extension 100, movable mass 3 is deflected relative to substrate 2 along main plane of extension 100 due to inertial forces. In such a deflection of movable mass 3 relative to substrate 2, the particular overlap areas between one fixed electrode 8 and the counter electrode on one side, and the adjoining other fixed electrode 8' and the counter electrode on the other side, change in opposite directions with respect to one another, so that a change in capacitance in opposite directions is also detectable, and the deflection of movable mass 3 is determinable within the scope of a differential evaluation. The surface area requirements of micromechanical structure 1 are advantageously significantly reduced, since the same surface region is used for providing detection means and for arranging the coupling springs. In particular, comparatively large spring elements which allow a deflection of movable mass 3 along main plane of extension 100 with comparatively large amplitudes may thus be implemented. In addition, implementation of fairly large capacitor surfaces of the plate capacitor structures is made possible, so that an increase in the sensor sensitivity may be achieved while the space requirements for micromechanical structure 1 remain the same. Micromechanical structure 1 is manufactured by initially providing substrate 2, then arranging fixed electrodes 8, 8' on substrate 2, and subsequently first functional layer 10 for producing first subregions 5 is deposited and appropriately structured, and lastly, second functional layer 20 for producing second subregion 6 and coupling springs 4 is deposited and appropriately structured.

It is also conceivable that an acceleration parallel to vertical direction 101 is detectable with the aid of micromechanical structure 1. When an acceleration acts on micromechanical structure 1 along vertical direction 101, movable mass 3 is deflected relative to substrate 2 perpendicular to main plane of extension 100 due to inertial forces. This causes a change in the distance between fixed electrodes 8, 8' and the areas of first subregions 5 which function as counter electrodes, which is detectable and quantitatively evaluatable via a change in capacitance in order to determine the acceleration.

Figure 2:
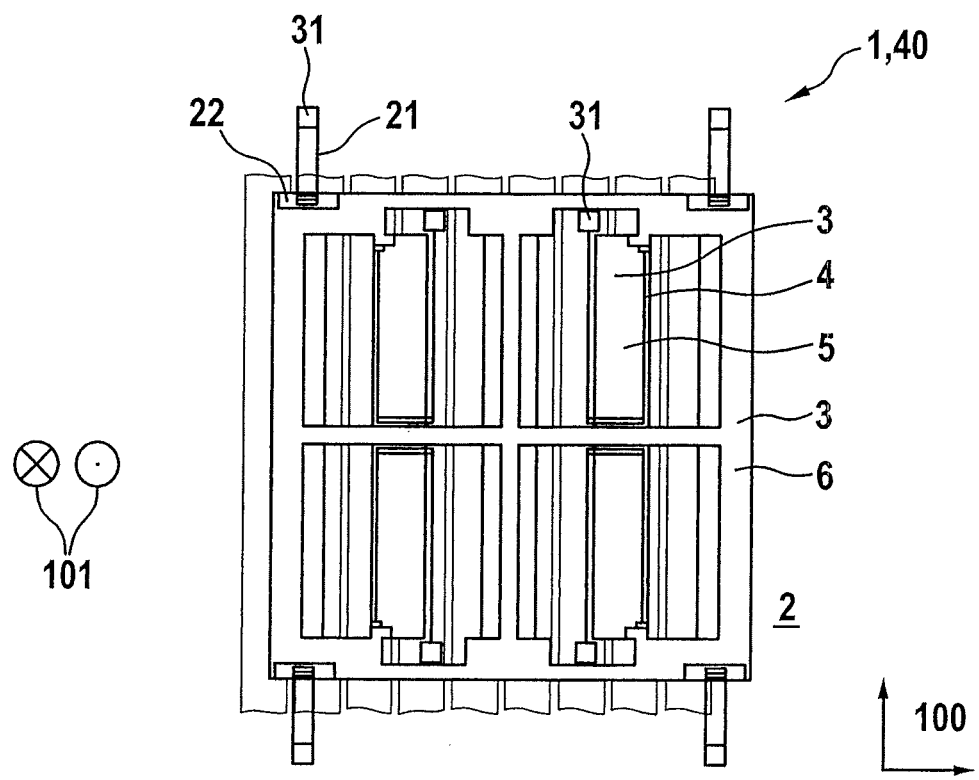
FIG. 2 shows a schematic view of a micromechanical structure designed as an acceleration sensor according to a second specific embodiment of the present invention.

FIG. 2 illustrates a schematic view of a micromechanical structure 1 designed as an acceleration sensor 40 according to a second specific embodiment of the present invention, the second specific embodiment being essentially the same as the first specific embodiment illustrated with reference to FIGS. 1a and 1b, except that micromechanical structure 1 according to the second specific embodiment has four stop springs 21. Stop springs 21 are used to limit a maximum deflection of movable mass 3 along vertical direction 101. Each stop spring 21 has an end which is connected to substrate 2 via a substrate anchor 31, and a free-standing end oriented in the direction of movable mass 3. Each free-standing end is situated at a distance from first subregion 5 along vertical direction 101, and from second subregion 6 along a direction parallel to main plane of extension 100. Stop springs 21 are likewise preferably provided in second functional layer 20, so that one stop region 22 of first subregion 5 is situated between each of stop springs 21 and substrate 2, along vertical direction 101. At its free-standing end, stop spring 21 has an elastic counterstop surface for stop region 22. It is conceivable for stop springs 21 to also be used at the same time as function springs, for example for increasing the restoring force of the sensor as soon as stop region 22 comes into contact with stop spring 21.

Figure 3:
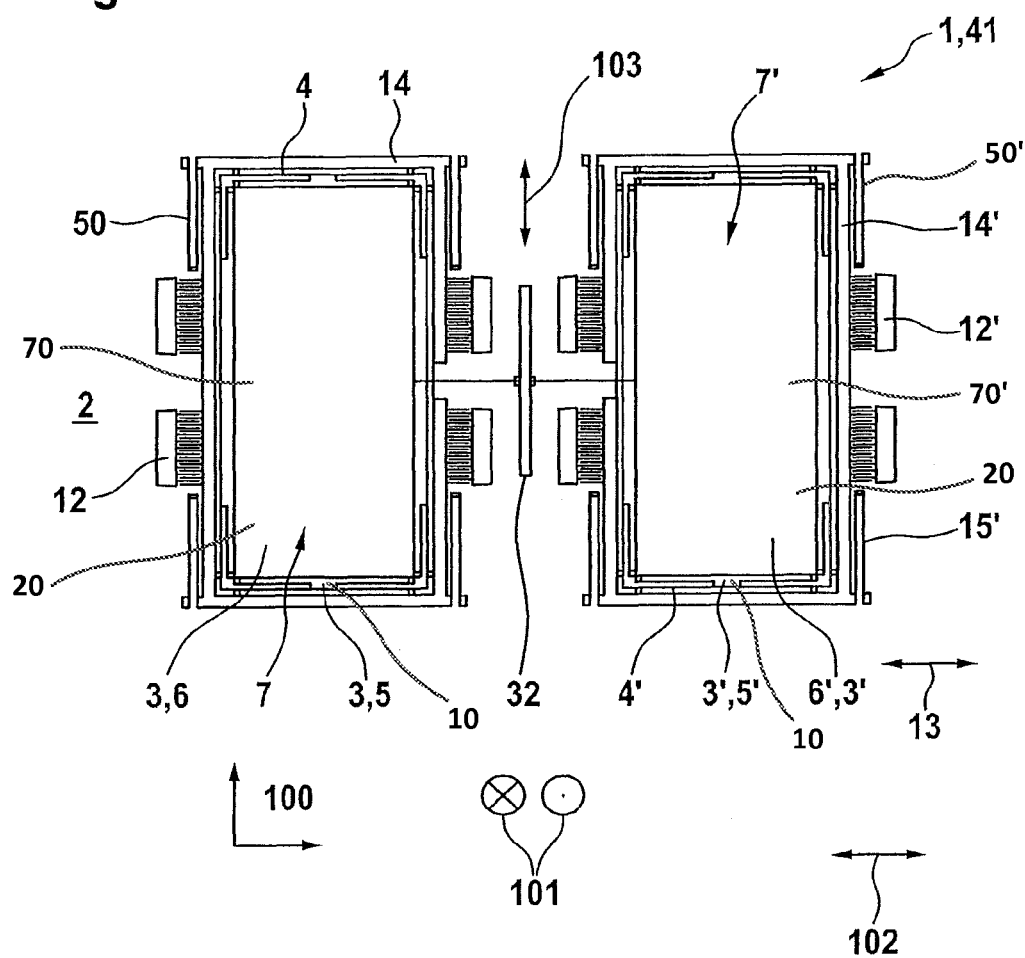
FIG. 3 shows a schematic view of a micromechanical structure designed as a yaw rate sensor according to a third specific embodiment of the present invention.

FIG. 3 illustrates a schematic view of a micromechanical structure 1 designed as a yaw rate sensor 41 according to a third specific embodiment of the present invention. Micromechanical structure 1 according to the third specific embodiment has two movable masses 3 which function as Coriolis elements 70, 70'. Movable masses 3, 3' are elastically coupled to one another via a Coriolis coupling spring. In addition, movable masses 3, 3' are elastically suspended via coupling springs 4, 4', respectively, on a drive element 14, 14' which is designed as a drive frame. Each of the two drive frames is elastically suspended on substrate 2 with the aid of further coupling springs 50, 50', respectively. Micromechanical structure 1 also has drive means 12, 12' in the form of comb drives which induce the two drive frames to vibrate in phase opposition along a vibration direction 102 parallel to main plane of extension 100. The corresponding vibrations are transmitted from the drive frames to movable masses 3, 3' via coupling springs 4, 4', respectively.

If a yaw rate is present along a sensing direction 103 which is parallel to main plane of extension 100 and perpendicular to vibration direction 102, Coriolis forces act on movable masses 3, 3' along vertical direction 101, causing movable masses 3, 3' to be deflected in phase opposition, in the direction of substrate 2 or away from substrate 2. The deflection is capacitively detected with the aid of fixed electrodes 8, 8' attached to the substrate (not visible in FIG. 3a for reasons of perspective). Fixed electrodes 8, 8' are situated between substrate 2 and movable mass 3, 3', respectively. Each of the two movable masses 3, 3' now includes a first subregion 5, 5' which is provided in a first functional layer 10, and a second subregion 6, 6' which is provided in a second functional layer 20. First and second subregions 5, 5'; 6, 6', respectively, are thus offset relative to one another along vertical direction 101. In addition, first and second subregions 5, 5'; 6, 6', respectively, are rigidly connected to one another in their mutual overlap area 7, 7', respectively. In contrast to movable masses 3, 3', coupling springs 4, 4' are provided only in second functional layer 20, so that coupling springs 4, 4' may extend unhindered over first subregions 5, 5', respectively. Movable masses 3, 3' are now composed of first and second subregions 5, 5'; 6, 6', respectively, in such a way that first subregions 5, 5' project over the edge areas of second subregions 6, 6', respectively, along main plane of extension 100, coupling springs 4, 4' extending in the edge areas. The surface area of first subregions 5, 5' is thus larger than the surface area of second subregions 6, 6'. First subregions 5, 5' function as counter electrodes for fixed electrodes 8, 8', respectively, so that fixed electrodes 8, 8' may also have a correspondingly larger design. As a result, the plate sizes of the plate capacitor structure are larger without the need for increased surface area requirements. The enlargement of the plate sizes is advantageously used to increase the capacitance, and thus, the sensor sensitivity.

Figure 4A:
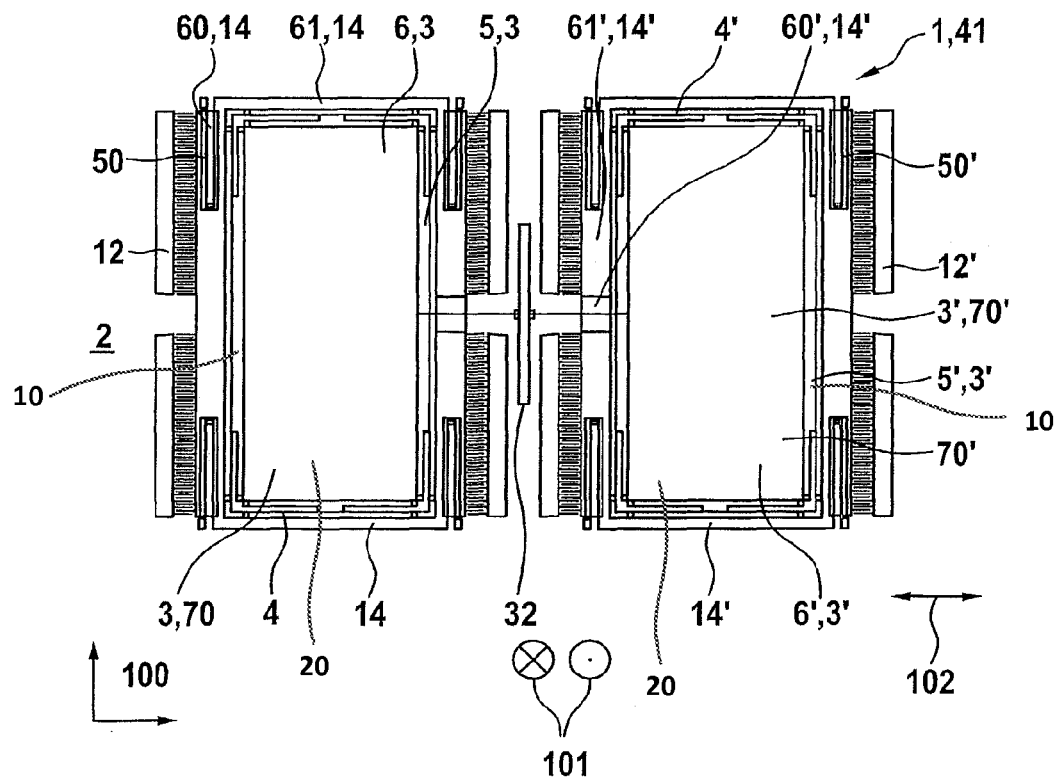
FIGS. 4a and 4b show schematic views of a micromechanical structure designed as a yaw rate sensor according to a fourth specific embodiment of the present invention.
Figure 4B:
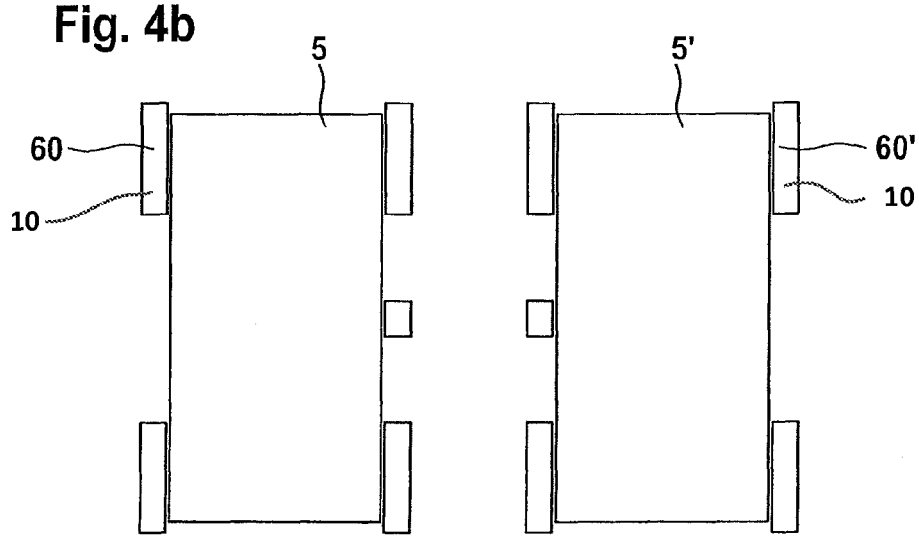

FIGS. 4a and 4b illustrate schematic views of a micromechanical structure 1 designed as a yaw rate sensor 41 according to a fourth specific embodiment of the present invention, the fourth specific embodiment being essentially the same as the third specific embodiment illustrated with reference to FIG. 3, except that drive elements 14, 14' designed as drive frames according to the fourth specific embodiment have further first subregions 60, 60' also provided in first functional layer 10. These further first subregions 60, 60' of the drive frames are fixedly connected to further second subregions 61, 61', respectively, provided in second functional layer 20. Further first subregions 60, 60' are advantageously used for reinforcing the drive frames known from FIG. 3, so that undesirable deformations of the drive frames due to the drive vibrations are suppressed, or at least shifted to higher frequencies. The surface area requirements for yaw rate sensor 41 are advantageously not increased in the process, since further first subregions 60' overlap with further coupling springs 50, 50', respectively, in vertical direction 101 without interference. This is achieved in that further first subregions 60, 60' are provided only in first functional layer 10, while further coupling springs 50, 50' are provided only in second functional layer 20. FIG. 4b shows, for demonstration, first functional layer 10 of yaw rate sensor 41 illustrated in FIG. 4a. It is apparent that only first subregions 5, 5' of movable masses 3, 3' designed as Coriolis elements 70, 70', and further first subregions 60, 60' of the movable masses designed as drive frames, are provided in first functional layer 10.

What is claimed is:

1. A micromechanical structure, comprising:
   a substrate which has a main plane of extension; and
   a mass which is movable relative to the substrate, the movable mass being elastically suspended via at least one coupling spring,
   wherein the micromechanical structure has a first functional layer and a second functional layer, the first and second functional layers being offset relative to one another along the vertical direction in such a way that, along the vertical direction, the first functional layer is situated between the substrate and the second functional layer, and
   wherein the movable mass contains at least two subregions,
      a first subregion of the movable mass, wherein the first subregion is at least partially situated between the substrate and the coupling spring along a vertical direction which is essentially perpendicular to the main plane of extension and wherein the first subregion is provided in the first functional layer, and
      a second subregion of the movable mass, wherein the second subregion of the movable mass is provided in the second functional layer.

2. The micromechanical structure as recited in claim 1, wherein the coupling spring engages directly at the second subregion.

3. The micromechanical structure as recited in claim 2, wherein the first subregion and the second subregion mutually overlap in an overlap area along the vertical direction, and wherein the first and the second functional layers in the overlap area are one of (i) directly fixedly connected to one another, or (ii) indirectly fixedly connected to one another via an intermediate layer.

4. The micromechanical structure as recited in claim 1, wherein the micromechanical structure has fixed electrodes which extend parallel to the main plane of extension and are situated between the first subregion and the substrate along the vertical direction, and wherein the fixed electrodes and the first subregion form a plate capacitor structure.

5. The micromechanical structure as recited in claim 1, wherein:
   the micromechanical structure has at least one stop spring which is (i) connected to the substrate and (ii) provided in the second functional layer;
   one stop region of the first subregion of the movable mass provided in the first functional layer is situated between the stop spring and the substrate along the vertical direction; and
   the stop spring is situated at a distance from the movable mass.

6. The micromechanical structure as recited in claim 5, wherein the micromechanical structure is part of an acceleration sensor, and the movable mass includes a seismic mass which is deflectable with respect to the substrate due to external acceleration forces.

7. The micromechanical structure as recited in claim 5, wherein:
   the micromechanical structure is part of a yaw rate sensor;
   the movable mass includes at least one of (i) a Coriolis element which is deflectable relative to the substrate by Coriolis forces when a yaw rate is present, and (ii) a drive element which is induced to vibrate by a drive mechanism and which is coupled via at least one drive spring to a Coriolis element which is deflectable relative to the substrate by Coriolis forces when a yaw rate is present, the drive element being coupled to the substrate with the aid of the coupling springs.

8. The micromechanical structure as recited in claim 5, wherein the micromechanical structure is part of an actuator, and wherein the movable mass includes an actuator which is drivable by a drive mechanism.

9. A method for manufacturing a micromechanical structure, comprising:
   in a first step, providing a substrate;
   in a second step, providing the first functional layer and providing a first subregion of a movable mass in the first functional layer; and
   in a third step, providing a second functional layer and providing a coupling spring in the second functional layer in such a way that the first subregion is situated between the substrate and the coupling spring along a vertical direction which is essentially perpendicular to a main plane of extension of the substrate, wherein the movable mass is elastically suspended via the coupling spring, and wherein a second subregion of the movable mass is provided in the second functional layer.

10. The method as recited in claim 9, wherein
   in an intermediate step carried out between the second step and the third step, an intermediate layer is provided on the first functional layer, and the intermediate layer is structured in such a way that the first subregion and the second subregion of the movable mass are rigidly connected to one another in an overlap area via the intermediate layer.

11. The micromechanical structure as recited in claim 1, wherein the second subregion functions as a frame on which the coupling springs directly engage.

12. The micromechanical structure as recited in claim 1, wherein the coupling springs are designed as interior spring structures, and wherein the interior spring structures are enclosed by the second subregion.

13. The micromechanical structure as recited in claim 3, wherein the first and second subregions are rigidly connected to one another at the overlap area.

\* \* \* \* \*